US006012028A

United States Patent [19]

Kubota et al.

[11] Patent Number: 6,012,028

[45] Date of Patent: Jan. 4, 2000

[54] TEXT TO SPEECH CONVERSION SYSTEM AND METHOD THAT DISTINGUISHES GEOGRAPHICAL NAMES BASED UPON THE PRESENT POSITION

[75] Inventors: Syuji Kubota; Yuichi Kojima, both of Kanagawa, Japan

[73] Assignee: Ricoh Company, Ltd., Japan

[21] Appl. No.: 09/014,711

[22] Filed: Jan. 28, 1998

[30] Foreign Application Priority Data

Mar. 10, 1997 [JP] Japan .................................... 9-072682

[51] Int. Cl.[7] ............................... G10L 9/00; G06F 15/50

[52] U.S. Cl. .......................... 704/260; 704/261; 704/277; 704/275; 704/270; 364/449; 364/443; 434/130

[58] Field of Search ..................................... 704/260, 235, 704/261, 270, 275, 277; 364/449, 443; 434/130

[56] References Cited

U.S. PATENT DOCUMENTS

| | | | |
|---|---|---|---|
| 4,898,537 | 2/1990 | Pryor | 434/130 |
| 5,164,904 | 11/1992 | Sumner | 364/436 |
| 5,173,691 | 12/1992 | Sumner | 340/905 |
| 5,177,685 | 1/1993 | Davis et al. | 364/443 |
| 5,452,212 | 9/1995 | Yokoyama et al. | 364/449 |
| 5,500,919 | 3/1996 | Luther | 704/278 |
| 5,884,218 | 3/1999 | Nimura et al. | 701/208 |

FOREIGN PATENT DOCUMENTS

| | | |
|---|---|---|
| 63-259412 | 10/1988 | Japan . |
| 6-289890A | 10/1994 | Japan . |
| 7-036906A | 2/1995 | Japan . |
| 8-076796A | 3/1996 | Japan . |
| 8-160983A | 6/1996 | Japan . |

OTHER PUBLICATIONS

1995–11, "Patent Information," Invention, vol. 92 No. 11, pp. 42–49 (1995) Nikkel Electronics, vol. 622, pp. 91–106, (1996)

W. John Hutchins & Harold L. Somers, An Introduction to Machine Translation, pp. 56–66.

*Primary Examiner*—David R. Hudspeth
*Assistant Examiner*—Vijay B Chawan
*Attorney, Agent, or Firm*—Knoble & Yoshida LLC

[57] ABSTRACT

The text to speech conversion system distinguishes geographical names based upon the present position and includes a text input unit for inputting text data, a position coordinator input unit for inputting present location information of the text to speech conversion system, and a text normalizer connected to the text input unit and the position coordinator input unit for capable of generating a plurality of pronunciation signals indicative of a plurality of pronunciations for a common portion of the text data, the text normalizer selecting one of the pronunciation signals based upon the present location information.

28 Claims, 14 Drawing Sheets

FIG. 5

| geographical name | state | pronunciation | part of speech | context information | coordinates data |
|---|---|---|---|---|---|
| Arlington | California | Arlington, CA | — — | — — | X21, Y21 |
| Arlington | Virginia | Arlington, VA | — — | — — | X22, Y22 |
| Texas | Colorado | Texas, CO | — — | — — | X23, Y23 |
| Texas | • • | • • | — — | — — | X24, Y24 |
| Stanford | • • | • • | — — | — — | X25, Y25 |
| Stanford | • • | • • | — — | — — | • • |
| Connecticut | • • | • • | — — | — — | • • |
| Connecticut | • • | • • | — — | — — | • • |

FIG. 9

| WRITE | PRONUNCIATION | PART OF SPEECH | CONTEXT INFORMATION | COORDINATES DATA | WEIGHT PARAMETER |
|---|---|---|---|---|---|
| 新宿 | shinjuku | | ● ● ● ● | X11, Y11 | W11 |
| 新宿 | shinjuku | | ● ● ● ● | X12, Y12 | W12 |
| ● | ● | ● | ● | ● | ● |
| ● | ● | ● | ● | ● | ● |
| 三田 | MITA | | ● ● ● ● | Xn1, Yn1 | Wn1 |
| 三田 | SANDA | | ● ● ● ● | Xn2, Yn2 | Wn2 |
| ● | ● | ● | ● | ● | ● |
| ● | ● | ● | ● | ● | ● |
| ● | ● | ● | ● | ● | ● |

CHARACTERISTIC NOUN

TEXT TO SPEECH CONVERSION SYSTEM AND METHOD THAT DISTINGUISHES GEOGRAPHICAL NAMES BASED UPON THE PRESENT POSITION

BACKGROUND OF THE INVENTION

1. Field of the Invention

This invention generally relates to a text to speech conversion system for converting letter image or phonetic symbols etc into voice, and particularly to a system capable of distinguishing geographical names based upon the present position.

2. Description of the Related Art

In a conventional Car Navigation System (CNS), the system receives coordinates of the present position of a mobile unit sent by Global Positioning System (GPS) and then indicates the position in a map on a display monitor such as a CRT etc. The above described CNS provides guidance such as various road-related information with voice for safety driving. Furthermore, the Vehicle Information and Communication System (VICS) such as disclosed in NIKKEI ELECTRONICS (Vol. 622, 1996. 5.20, P91 ? P106) is generally beginning to put into use. The VICS, which does not have a database including phonetic symbols corresponding to messages of the guidance, delivers text to speech conversion.

Japanese Laid Open Publication 63-259,412 also discloses another example of the above systems. Japanese Open Laid 63-259,412 shows both a present position of a mobile unit on a route to a destination. The system also selects a proper route for the destination, provides the information on the selected route and then guides by voice according to the present position on the selected route. The above information guidance only outputs a limited number of fixed phrases of messages in the system. In contrast, the system needs an enormous amount of voice data in order to provide various route information by recorded voice. In particular, the system has to inform drivers of a large number of geographical names. Since, the system can not hold an enormous amount of voice data representing geographical names, the above-described systems are not capable of adopting the VICS. For this reason, some additional text to speech conversion systems are proposed to solve the geographical name problem.

Japanese Laid Open Publication 08-76,796 discloses a system which separates a sentence with variable-length messages and fixed-length messages and then acoustically synthesizes voice data by transforming the variable-length messages based upon voice synthesis rules and voice data corresponding to the fixed-length messages. However, the above system is unable to distinguish nouns that have plural pronunciations with the same notation. This problem is especially common among Japanese characters used for geographical names. Other systems are proposed to solve the above problem in Japanese Laid Open Publications 06-289,890 and Japanese Laid Open 7-36,906. Japanese Laid Open 06-289,890 discloses an apparatus which distinguishes certain Japanese characters that have plural pronunciations with the same notation. The system has an idiomatic expression dictionary. When the system analyzes sentences containing nouns that have plural pronunciations with the same notation, the system distinguishes the nouns based upon an idiomatic relation with respect to adjacent words. On the other hands, the Japanese Open Laid 7-36,906 discloses a distinction system by changing an order of priority of Japanese characters in a word dictionary that have plural pronunciations for the above described sentence analysis. In other words, the system intends to distinguish plural pronunciations by changing the order of priority of the Japanese characters stored in the word dictionary.

Nevertheless, the above systems are unable to correctly distinguish nouns that have plural pronunciations with the same notation. Furthermore, the Japanese Laid Open Publication 7-36,906 does not clearly disclose how distinctions are correctly made based upon the modified order of priority of the words that have plural pronunciations with the same notation.

In the above described systems, the systems have a dictionary which stores the words that have plural pronunciations with the same notation and distinguishes the words by a word retrieval function of the word dictionary in the morpheme analysis. In other words, the above systems distinguish the words that have plural pronunciations with the same notation based upon the morpheme analysis during the word retrieval from the word dictionary so as to read the information that is inputted by the VICS etc. As already mentioned, when the words are geographical names, many of them have plural pronunciations with the same notation in the Japanese language. In contrast, geographical names have the same notation and the same pronunciation even though locations corresponding to the word differ in the English language. For example, there are the geographical names such as Texas, Connecticut, Arlington in the United States of America. Inventors of the present invention identified that nouns representing geographical names that have plural pronunciations with the same notation or the same pronunciation but different locations be precisely distinguished based upon the context. For example, 三田 of Tokyo Metropolis of Japan (pronunciation is "MITA") and 新宿 of Hyogo Prefecture of Japan pronunciation is "SANDA"). The word dictionary has to uniquely store such that notation in the above systems. Accordingly, the system needs to select one of the plural pronunciations with the same notation, and stores only a selected notation into the word dictionary.

Furthermore, inventors of the present invention also identified that nouns representing geographical names having same notation and same pronunciation desired to correctly distinguish these geographical names based upon the context. Mispronunciation of geographical names becomes a fatal disadvantage in the car navigation system.

SUMMARY OF THE INVENTION

To solve the above and other problems, according to one aspect of the present invention, a text to speech conversion system that distinguishes geographical names based upon the present position, including: a text input unit for inputting text data; a position coordinator input unit for inputting present location information of the text to speech conversion system; and a text normalizer connected to the text input unit and the position coordinator input unit for capable of generating a plurality of pronunciation signals indicative of a plurality of pronunciations for a common portion of the text data, the text normalizer selecting one of the pronunciation signals based upon the present location information.

According to a second aspect of the present invention, a text to speech conversion system that distinguishes geographical names based upon the present position including: a text input unit for inputting text data; a voice generator generating voices on the basis of the phonetic signals; a phonetic rules synthesizer connected to the voice generator for converting phonetic symbols to phonetic signals; a position coordinator input unit for inputting present location information of the text to speech conversion system; and operationally connected to a geographical dictionary storing text having plural pronunciations with the same notation and coordinate data corresponding to the text data; a text normalizer connected to the text input interface and the phonetic rules synthesizer for converting the text data to phonetic symbols based upon a morpheme analysis as well as a phoneme and prosody rules operation, the text normalizer selecting a pronunciation according to the present situation and the situation data.

A text to speech conversion apparatus that distinguishes geographical names based upon the present position, comprising: text input means for inputting text data; position coordinator input means for inputting present location information of the text to speech conversion system; and text normalizing means for capable of generating a plurality of pronunciation signals indicative of a plurality of pronunciations for a common portion of the text data, said text normalizing means selecting one of the pronunciation signals based upon the present location information.

A text to speech conversion apparatus that distinguishes geographical names based upon the present position comprising: text input means for inputting text data; phonetic rules synthesizing means for converting phonetic symbols to phonetic signals; voice generating means for generating a voice output on the basis of the phonetic signals; position coordinator input means for inputting present location information of the text to speech conversion system; text normalizing means for converting the text data to phonetic symbols based upon a morpheme analysis as well as a phoneme and prosody rules operation, said text normalizing means selecting a pronunciation according to the present situation and the situation data.

A method of converting text to speech, comprising the steps of: inputting text data; inputting a present location information; converting a common portion of the text data to multiple pronunciations; and selecting one of the multiple pronunciations based upon the present location information.

BRIEF DESCRIPTION OF THE DRAWINGS

Other objects and further features of the present invention will become apparent from the following detailed description when read in conjunction with the accompanying drawings, wherein:

FIG. 5 is a table structure of geographical name dictionary in English version of the first preferred embodiment;

FIG. 9 is a second preferred embodiment of a table structure of a geographical name dictionary;

DESCRIPTION OF THE PREFERRED EMBODIMENT

Figure 1:
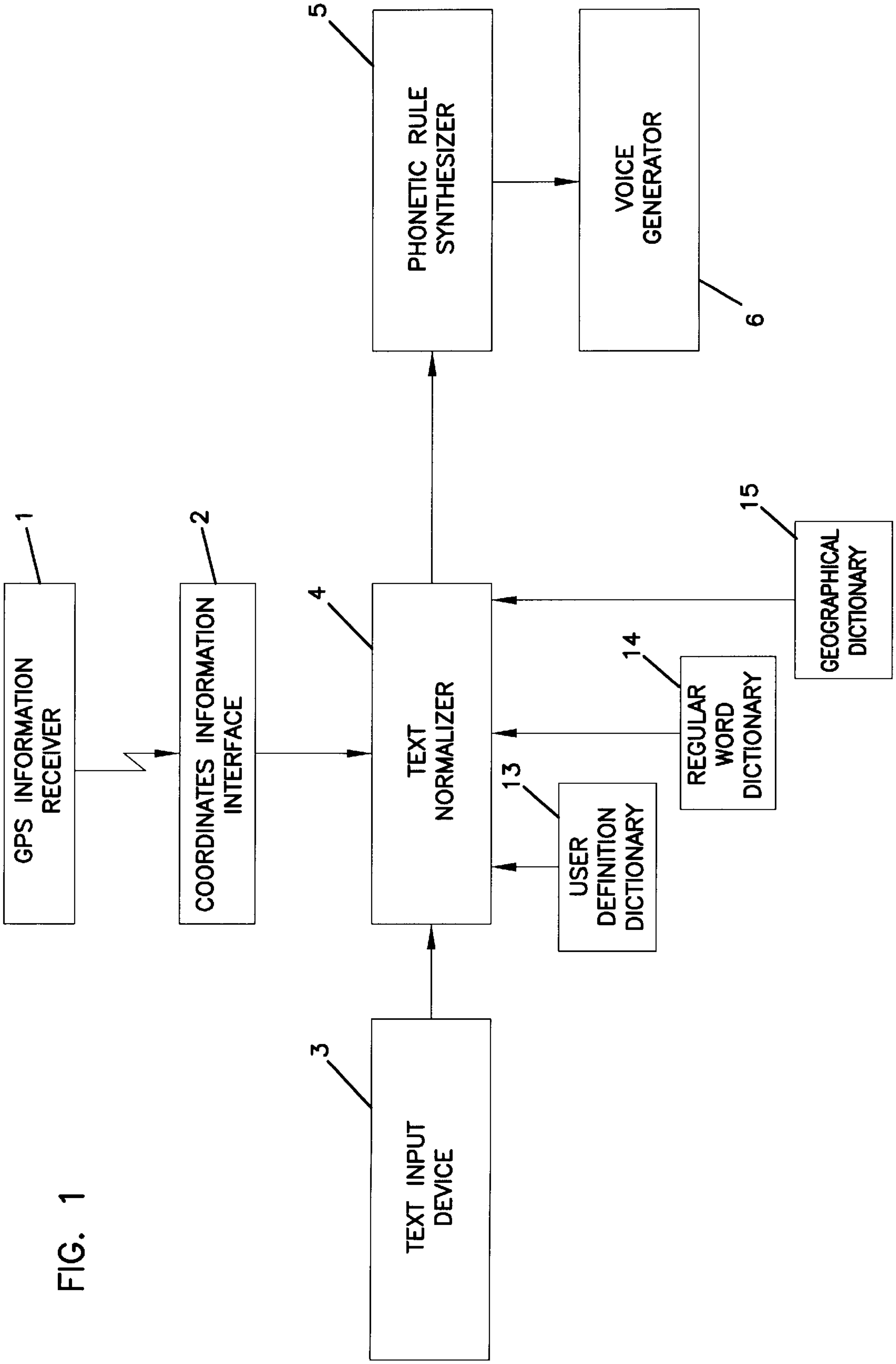
FIG. 1 is a block diagram of a first preferred embodiment of the text to speech conversion system according to the present invention.

A description will now be given for preferred embodiments according to the present invention. FIG. 1 shows a block diagram of a preferred embodiment of the text to speech conversion system according to the invention. The text to speech conversion system includes a GPS information receiver 1, a coordinates information interface 2, a text input device 3, a text normalizer 4, a phonetic rules synthesizer 5, a voice generator 6, an user definition dictionary 13, a regular word dictionary 14 and a geographical name dictionary 15.

The GPS receiver 1 receives GPS present coordinates (latitude and longitude data) on geography of the ground, namely GPS information. The coordinate information interface 2 inputs coordinate information corresponding to the present position of the text to speech conversion system that GPS receiver 1 receives. The text input device 3 inputs text information from a hard disk and/or a computer located outside of the system. The text normalizer 4 inputs the text information from the text input interface 3, and also performs a morpheme analysis operation as well as a phoneme and prosody rules operations based upon the coordinates information corresponding to the present position of the system that the GPS receiver 1 receives. Furthermore, the text normalizer 4 generates phonetic symbols corresponding to the text information. Details of the text normalizer 4 will be described later. The phonetic rule synthesizer 5 transforms the phonetic symbols that are generated by the text normalizer 4 to pronunciation signals. Finally, the voice generator 6 generates voice based upon the pronunciation signals that are transformed by the phonetic rules synthesizer 5. For example, the morpheme analysis in the text normalizer 4 includes a structure analysis operation that is disclosed in "An introduction to machine to transaction", W. John Hutchins & Harold L. Somers, P56–P66.

Figure 2:
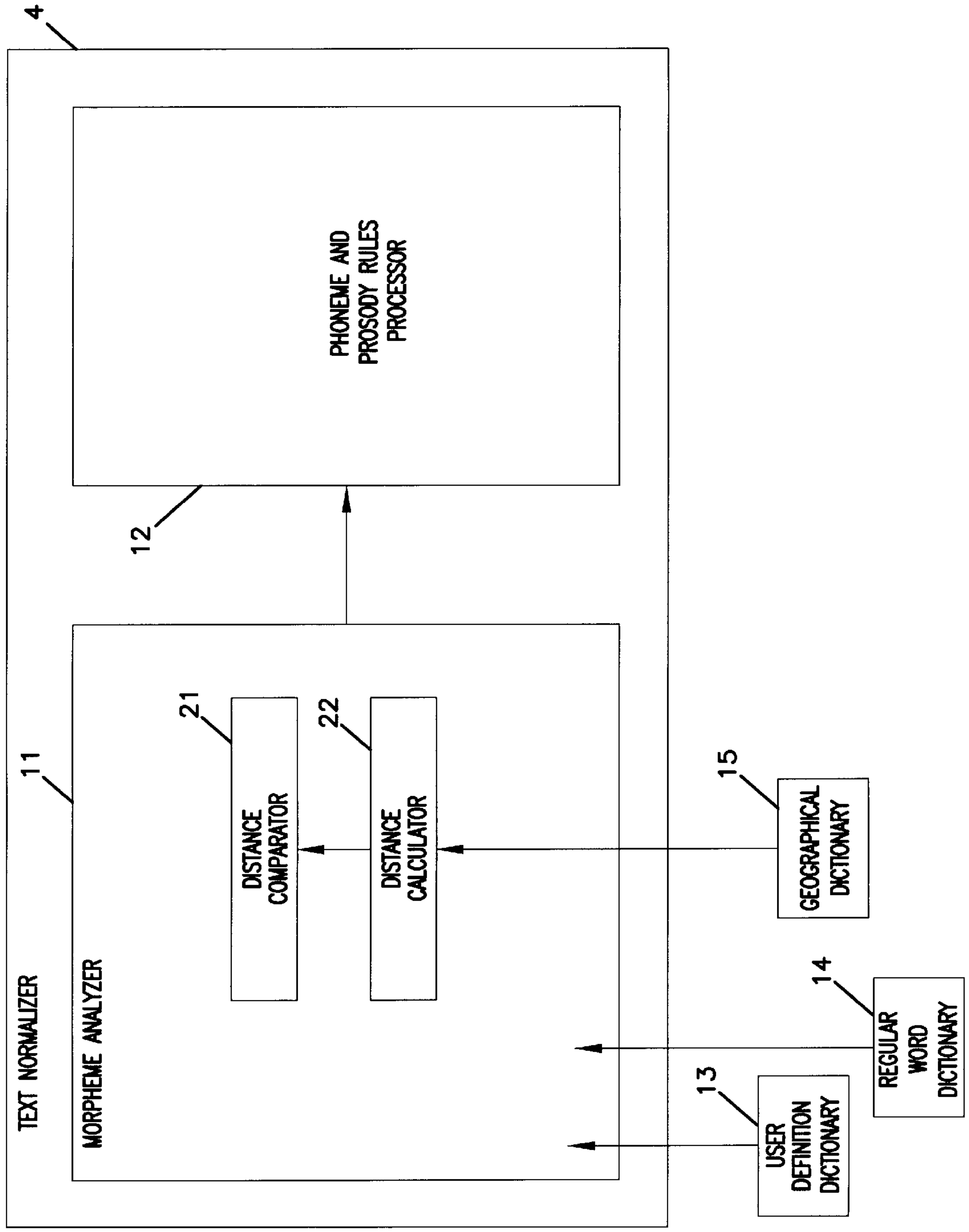
FIG. 2 is a detail diagram of the text normalizer of the first preferred embodiment in the text to speech conversion system according to the present invention.

FIG. 2 shows a detail diagram of the text normalizer 4 which includes a morpheme analyzer 11 as well as a phoneme and prosody rules processor 12. The text normalizer 4 also includes a distance comparator 21 and a distance calculator 22. The morpheme analyzer 11 connects a user definition dictionary 13, a regular word dictionary 14 and a geographical name dictionary 15. In detail, the geographical name dictionary 15 connects the distance calculator 22 with the morpheme analyzer 11.

Figure 3:
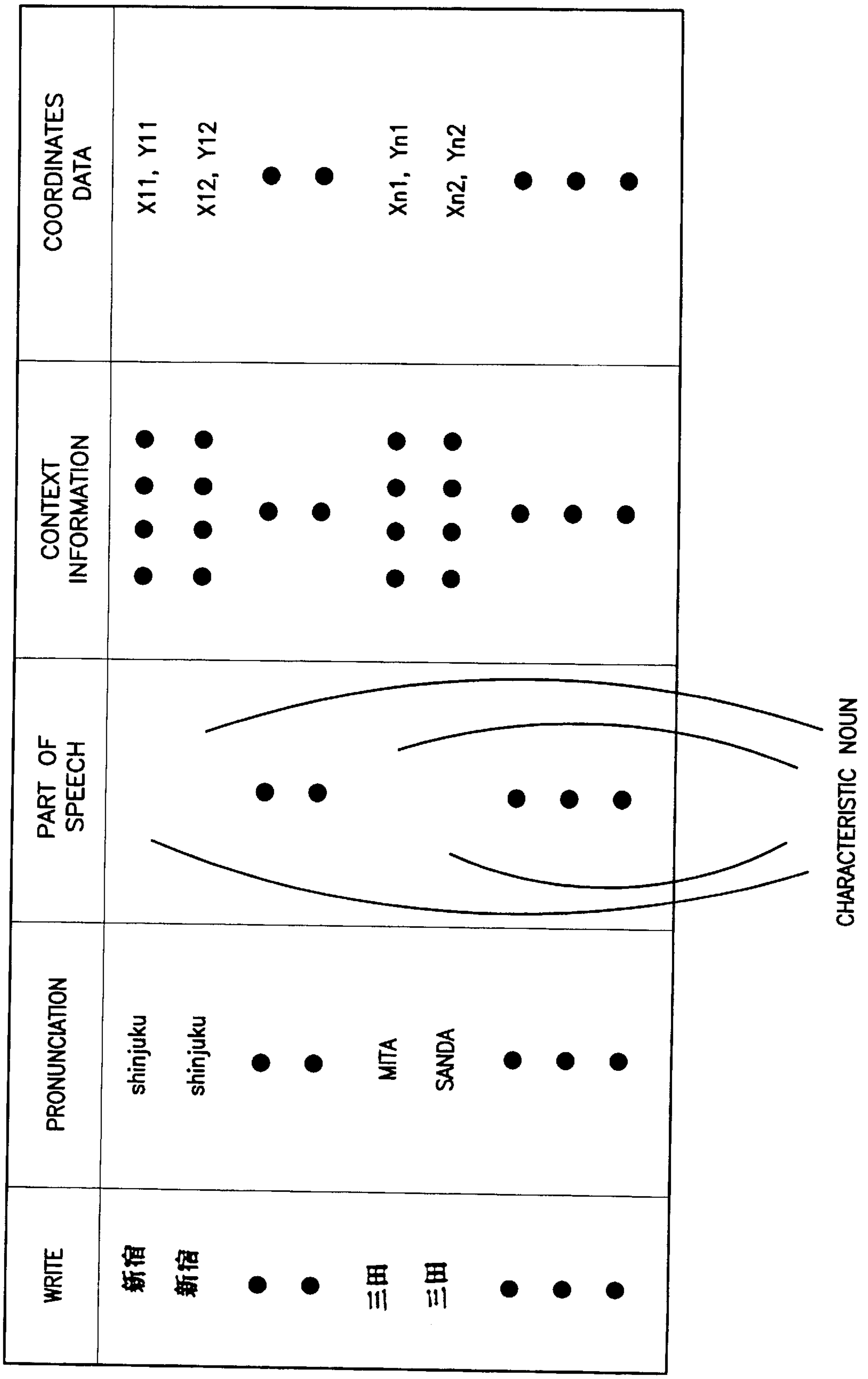
FIG. 3 is a table structure of a geographical name dictionary of the first preferred embodiment.

FIG. 3 shows contents of the geographical name dictionary 15. The geographical name dictionary 15 holds at least geographical names and corresponding pronunciations. In FIG. 3, the geographical name dictionary 15 also holds written notations or characters corresponding to pronunciations, part of speeches, context information and coordinates data corresponding to each of the geographical names. Furthermore, the geographical name dictionary 15 stores the geographical names that have plural pronunciations with the same notation and coordinates data corresponding to each geographical names. When the geographical name that have plural pronunciations with the same notation is selected, the text to speech conversion system calculates the distances between the present position of the system and positions corresponding to each pronunciations.

Figure 4:
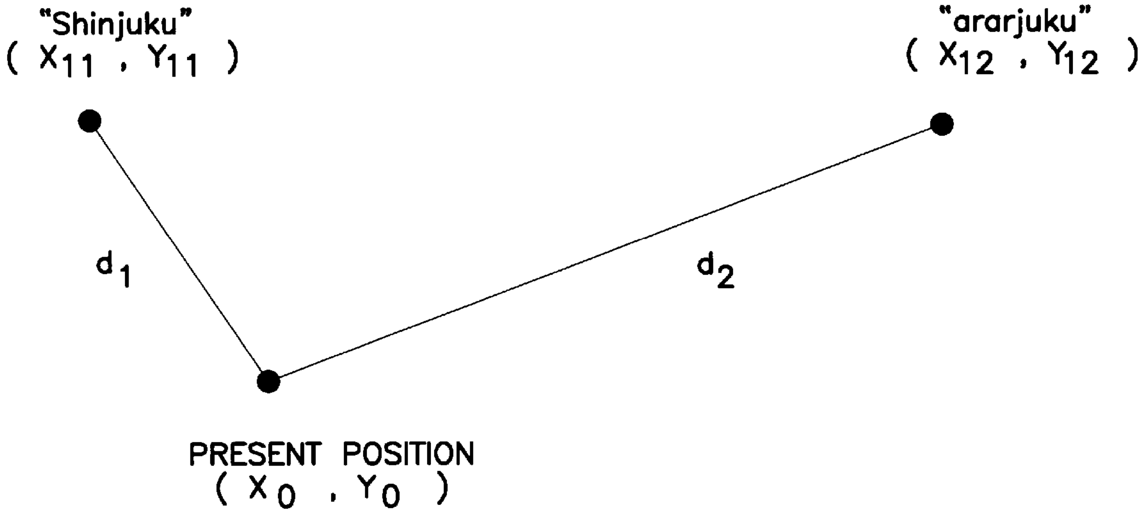
FIG.4 is a conceptional position relation of the first preferred embodiment in the text to speech conversion system according to the present invention.

Referring to FIG. 4, for example, 新宿 is pronounced "shinjuku" in Tokyo and is also pronounced "arajuku" in Saitama Prefecture in Japan. When the text to speech conversion system consults two pronunciations such as "shinjuku" and "arajuku", the text to speech conversion system calculates the distance (d1) between the present position (X0, Y0) of the system and the coordinates (X11, Y11) corresponding to the pronunciation of the "shinjuku". Furthermore, the text to speech conversion system also calculates the distance (d2) between the present position (X0, Y0) of the system and the coordinates (X12, Y12) corresponding to the pronunciation of the "arajuku." Subsequently, the text to speech conversion system compares the above distances and selects the shorter distance of the two. When a mobile unit equipped with the text to speech conversion system moves near "shinjuku," the text to speech conversion system selects the "shinjuku." Because the distance (d1) between the present position of the text to speech conversion system and coordinates corresponding to "shinjukul" is shorter than the distance (d2) between the present position of the system and coordinates corresponding to "arajuku."

Now referring to FIG. 5, another type of the geographical name dictionary 15 holds at least the geographical names, the state that each geographical names exist and the coordinates data corresponding to each geographical names. For example, the geographical names such as "Arlington" exist in plural states in the United States. When the text to speech conversion system outputs an autdio signal for generating voice, only pronouncing "Arlington," a user generally does not understand where "Arlington" is with respect to its relevant state.

Therefore, when the text to speech conversion system consults whether "Arlington" is in Virginia or California, the conversion system calculates the distance (d1) between the present position (x0, Y0) of the system and the coordinates (X11, Y11) corresponding to the "Arlington" in Virginia. Furthermore, the text to speech conversion system also calculates the distance (d2) between the present position (X0, Y0) of the system and the coordinates (X12, Y12) corresponding to the "Arlington" in California. Subsequently, the text to speech conversion system compares the above two distances and selects the shortest distance of the two. When a mobile unit equipped with the text to speech conversion system moves near "Arlington" in Virginia, the system selects the "Arlington," Virginia and additionally pronounces the state name in which Virginia exists. Because the distance (d1) between the present position of the text to speech conversion system and coordinates corresponding to "Arlington" in Virginia is shorter than the distance (d2) between the present position of the system and coordinates corresponding to "Arlington" in California.

Figure 6:
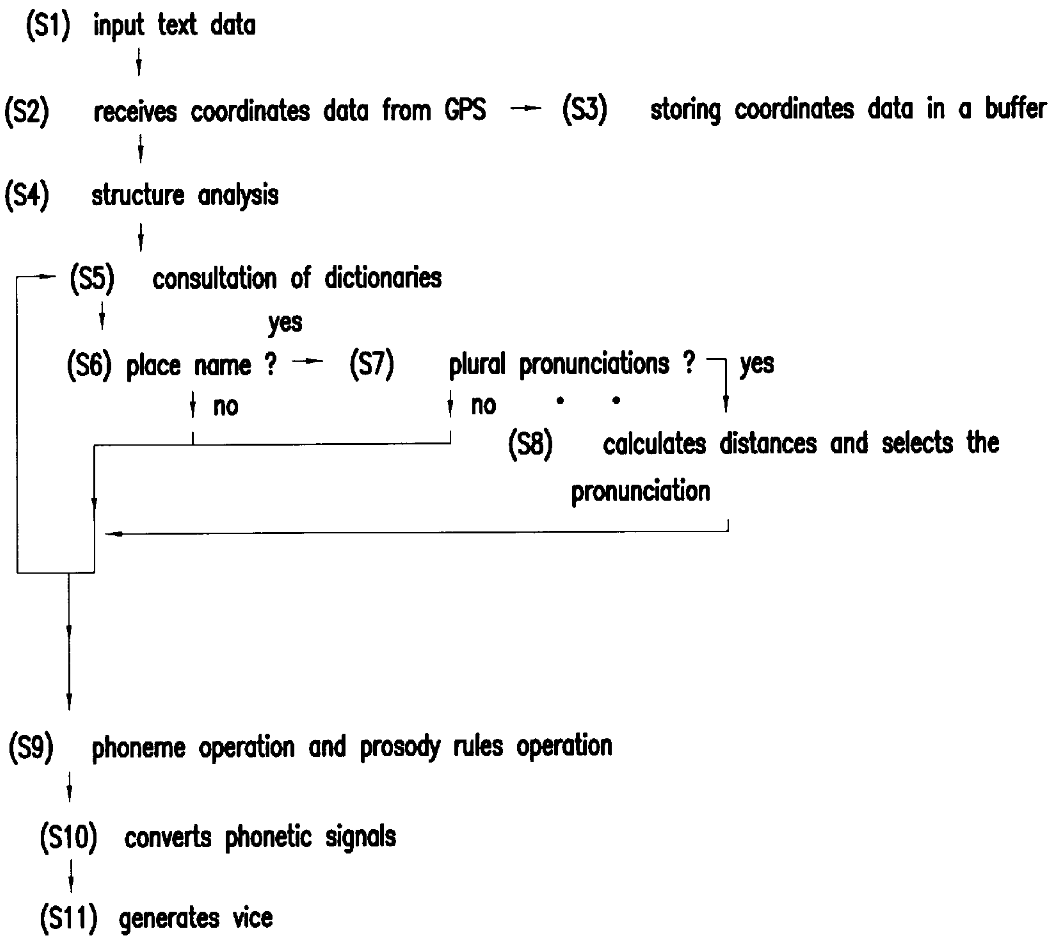
FIG. 6 is a flow chart illustrating steps involved in a first preferred process performed by the text to speech conversion system according the present invention.

FIG. 6 is a flowchart illustrating steps involved in a first preferred process. In a step S1, text data is inputted in the text to speech conversion system. When the text data is received by the text to speech conversion system, GPS information such as coordinates data corresponding to the present position of the system is simultaneously received in a step S2. The received coordinate information is stored in a step S3. A conventional structure analysis is performed on the inputted text data in a step S4. Furthermore, when the nouns are detected by the structure analysis in the step S4, the word dictionaries are consulted in a step S5. Subsequently, the consulted nouns are determined whether or not the nouns are geographical names in a step S6. If the nouns are geographical names in a step S6, the nouns are checked whether or not the nouns have plural pronunciations with the same notation in reference to a geographical name dictionary in a step S7. On the other hand, if the nouns are not geographical names in the step S6, a phoneme and prosody rules operation is performed on the nouns in a step S9. Each distance between positions corresponding to plural pronunciations of the stored geographical names and the present position of the text to speech conversion system is calculated in a step S8. Still in the step S8, The distances are compared with each other, and the pronunciation is selected based upon the calculated distances. The shortest distance is selected as the selected pronunciation corresponding to the geographical name in the step S8. Sequentially, a phoneme and prosody rules operation is performed on the selected nouns in a step S9. After the phoneme and prosody rules operation is performed, the phonetic symbols are converted to phonetic signals in a step S10. Finally, voice is generated on the basis of the phonetic signals in a step S11.

Figure 7:
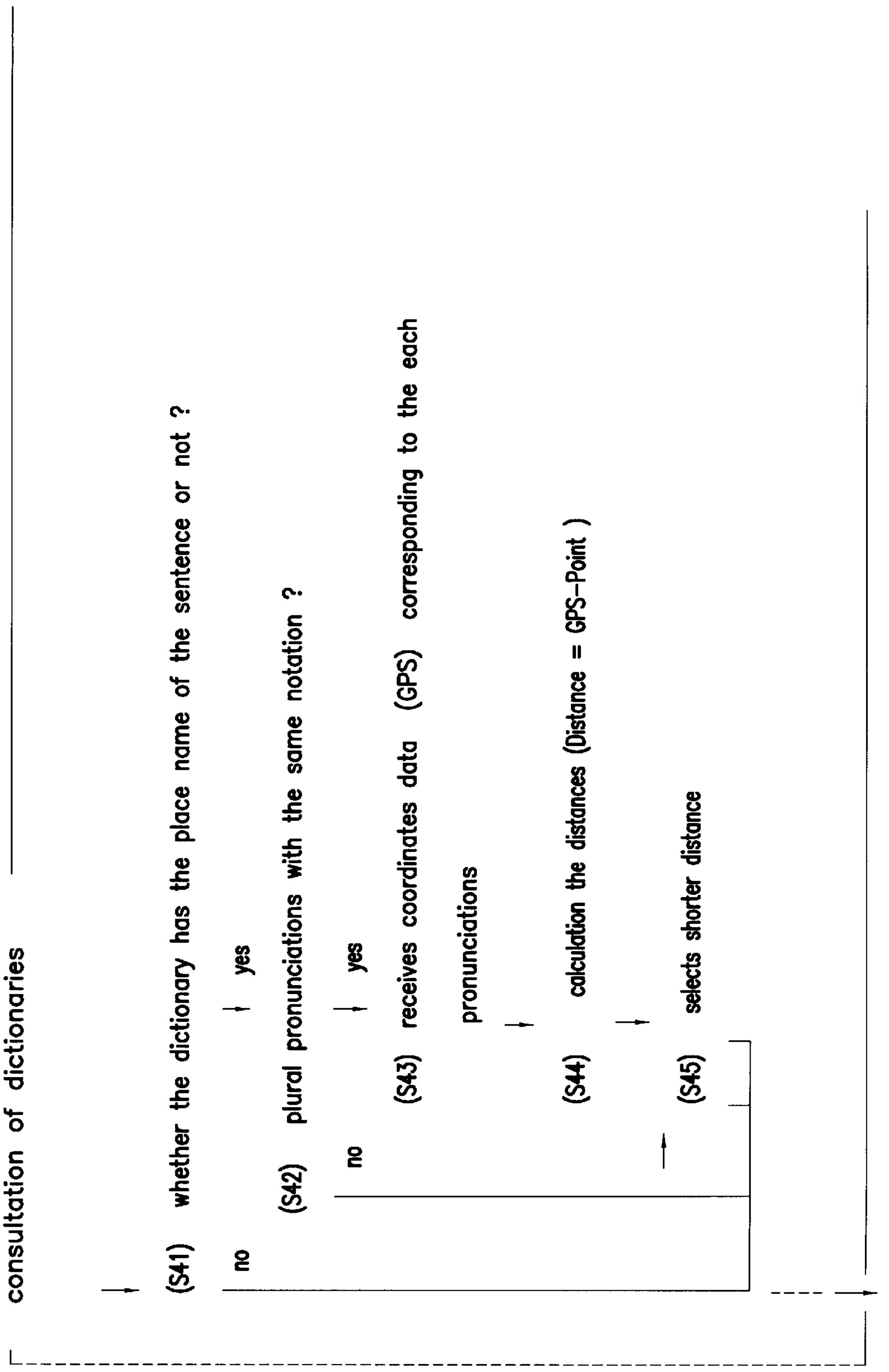
FIG. 7 is an another flow chart illustrating steps involved in a second preferred process of the text to speech conversion system according to the present invention.

Furthermore, FIG. 7 is a flow chart depicting how the system distinguishes the geographical names that have plural pronunciations with the same notation. An analyzed sentence is verified whether or not the inputted sentence has geographical names based on the structure analysis in a step S41. If the inputted sentence does not have geographical names, the results after the structure analysis are sent to next step. If the inputted sentence has geographical names, the geographical names are verified whether they are nouns having plural pronunciations with the same notation in a step S42. If the geographical names do not have plural pronunciations, the geographical names are converted to pronunciations in the step S42. If the geographical names have plural pronunciations, the present position information of the text to speech conversion system is inputted in a step S43. And then, each distance between the inputted present position of the text to speech conversion system and the coordinates corresponding to plural pronunciations of the geographical name is calculated in a step S44. Finally, the distances are compared with each other and the shortest distance is selected as the distance corresponding to a proper pronunciation in a step S45. The pronunciation is outputted as a correct pronunciation of the geographical name that has plural pronunciations.

In detail example, when the mobile unit with the text to speech conversion system is moving in the Kanto area near Tokyo, the geographical name dictionary 15 of the text to speech conversion system stores both geographical names, 三田 pronounced "mita" in Tokyo, Japan and 三田 pronounced "sanda" in Hyogo prefecture, Japan. When the text to speech conversionrsystem has an input message such as 三田の交差点で交通事故発生 ("There is a traffic accident at mita's intersection.") which VICS outputs, the morpheme analyzer 11 of the text normalizer 4 extracts the pronunciations "mita" and "sanda" corresponding to the geographical name 三田 after referring to the geographical name dictionary 15. The distance calculator 22 calculates the distances between the present position of the system and the coordinates corresponding to each pronunciation, "mita" and "sandal". The distance comparator 21 compares the above distances and selects the pronunciation of "mita." Thus, the text to speech conversion system can correctly distinguish the pronunciation of the geographical name that has plural pronunciations with the same notation according to the present position of the text to speech conversion system.

Figure 8:
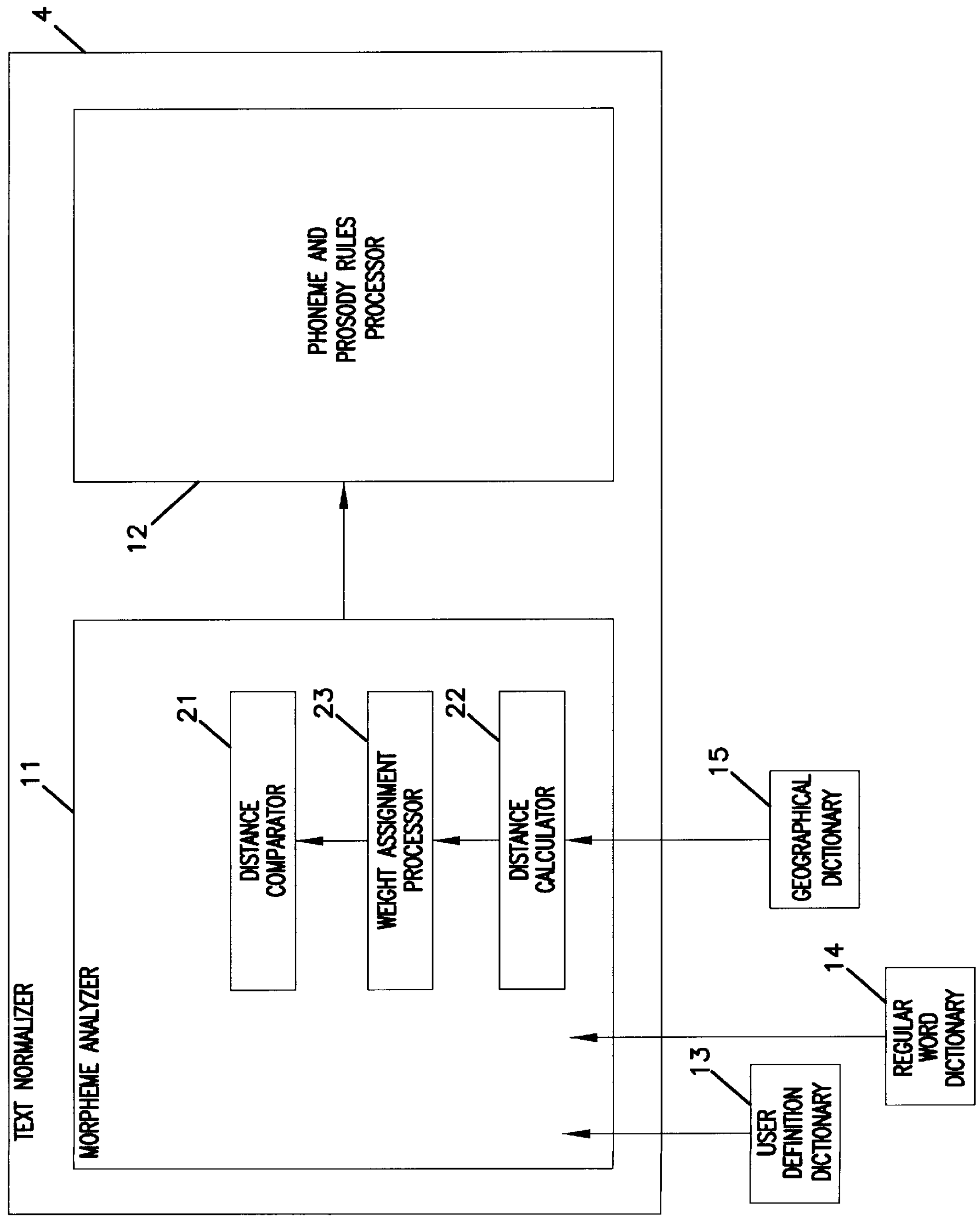
FIG. 8 is a detail diagram of a second preferred embodiment of the text normalizer in the text to speech conversion system according to the present invention.

FIG. 8 shows a block diagram of a text normalizer 4 in the text to speech conversion system of a second embodiment according to the present invention. The same elements and steps explained in the first embodiment are omitted. The text to speech conversion system has a case that the system needs to distinguish and select a particular pronunciation about the geographical name in a specified local area on geography. For example, 新宿 is generally pronounced "shinjuku". Although there is a geographical name pronounced "arajuku," in Saitama Prefecture, Japan that has the same notation, 新宿 Therefore, when a mobile unit equipped with the text to speech conversion system moves near "arajuku," the text to speech conversion system selects the pronunciation of the "arajuku" even if the destination of the mobile unit is "shinjuku".

In the second embodiment, the text normalizer 4 additionally has a weight assignment processor 23 in order to solve the above problem in the text to speech conversion system. Thereupon, the system only selects pronunciation corresponding to a geographical name within a special local area. The text to speech conversion system also selects pronunciations according to the first embodiment outside of the above special area. A geographical name dictionary 15 additionally stores peculiar weight parameters corresponding to each of the pronunciations of a geographical name that has plural pronunciations with the same notation as shown FIG. 9. A morpheme analyzer 11 in the text normalizer 4 has a weight assignment processor 23, which connects the geographical name dictionary 15 and a distance calculator 22.

Figure 10:
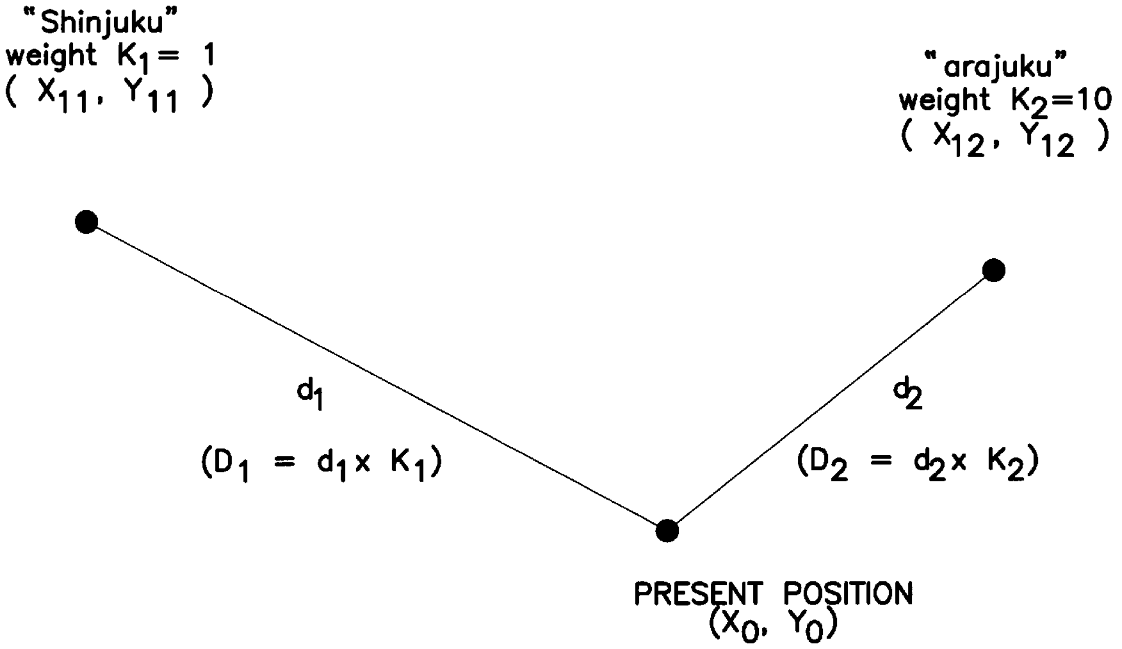
FIG. 10 is a conceptional position relation of the second preferred embodiment in the text to speech conversion system according to the present invention.

Referring to FIG. 10, the pronunciation of "shinjuku" is assigned weight K1 (for example K1=1). Furthermore, the pronunciation of "arajuku" is assigned weight K2 (for example K2=10). The text to speech conversion system is assumed to be located near "arajuku" in relation to "shinjuku". To be more specific, for example, the actual distance (d2) between the present position of the text to speech conversion system and coordinates corresponding to the "arajuku" is "2". The actual distance (d1) between the present position of the text to speech conversion system and coordinates corresponding to the "shinjuku" is "8". The calculated virtual distance (D2) between the present position of the text to speech conversion system and coordinates corresponding to the "arajuku" becomes 20 (2*10). The calculated virtual distance (D1) between the present:

position of the text to speech conversion system and coordinates corresponding to the "shinjuku" also becomes 8 (8*1). Therefore, the text to speech conversion system selects the pronunciation corresponding to "shinjuku."

The text to speech conversion system is assumed tobe located far from "arajuku" in relation to "shinjuku." To be more specific, for example, the actual distance (d2) between the present position of the text to speech conversion system and coordinates corresponding to the "arajuku" is "8". The actual distance (d1) between the present position of the text to speech conversion system and coordinates corresponding to the "shinjuku" is "2". The calculated virtual distance (D2) between the present position of the text to speech conversion system and coordinates corresponding to the "arajuku" becomes 80 (8*10). The calculated virtual distance (D1) between the present position of the text to speech conversion system and coordinates corresponding to the "shinjuku" also becomes 2 (2*1). Therefore, the text to speech conversion system selects the pronunciation corresponding to "shinjuku."

In the text to speech conversion system exists the nearest position of "arajuku". To be more specific, the actual distance (d2) between the present position of the text to speech conversion system and coordinates corresponding to the "arajuku" is "p1." The actual distance (d1) between the present position of the text to speech conversion system and coordinates corresponding to the "shinjuku" is "20." The calculated virtual distance (D2) between the present position of the text to speech conversion system and coordinates corresponding to the "arajuku" becomes 10(1*10). The calculated virtual distance (D1) between the present position of the text to speech conversion system and coordinates corresponding to the "shinjuku" also becomes 20 (20*1). Therefore, the text to speech conversion system selects the pronunciation corresponding to "arajuku."

Thereupon, when the text to speech conversion system is located in a regular range which adjoined "arajuku," the notation of 新宿 is pronounced "arajuku." Therefore, the geographical dictionary 15 storing the geographical names that have plural pronunciations with the same notation should be set up only one in the text to speech conversion system. The text to speech conversion system does not need to set up the plural geogrlaphical dictionaries corresponding to each region.

Figure 11:
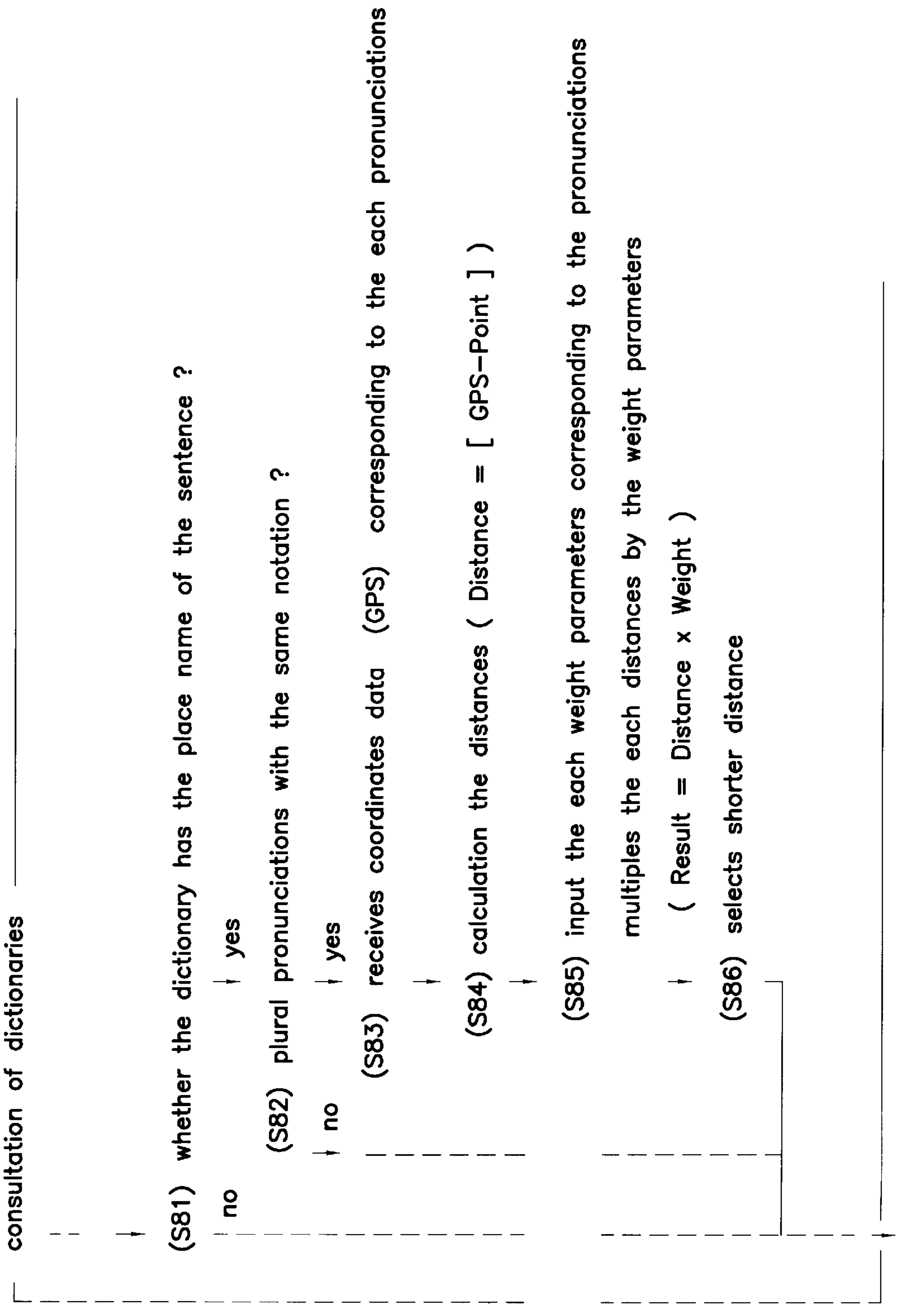
FIG. 11 is a flow chart of steps involved in the text to speech conversion system according to the present invention.

Referring to a flowchart of FIG. 11, every analyzed sentence is verified whether or not the sentence has geographical names during the structure analysis operation in a step S81. If the inputted sentence does not. have a geographical name, the results after the structure analysis operation are sent to a phoneme and prosody rules process in the step S81. If the sentence has a geographical. name, the geographical name is verified whether the geographical name is a noun having plural pronunciations with the same notation in a step S82. If the geographical name does not have plural pronunciations, the geographical name is converted to pronunciation in the step 82. If the geographical name has plural pronunciations, the GPS information including the present point information of the text to speech conversion system is inputted in a step S83. Then, each distance between the present position of the system and the coordinates corresponding to each of the plural pronunciations of the geographical name is calculated in a step S84. A weight parameter corresponding to the pronunciation of the geographical name is inputted from a geographical name dictionary and multiplies each of the distances by in a step S85. Finally, the weighed distances are compared and the pronunciation corresponding to the shortest distance of the above weighed distances is selected in a step S86. The pronunciation is outputted as a proper pronunciation of the geographical name.

Figure 12:
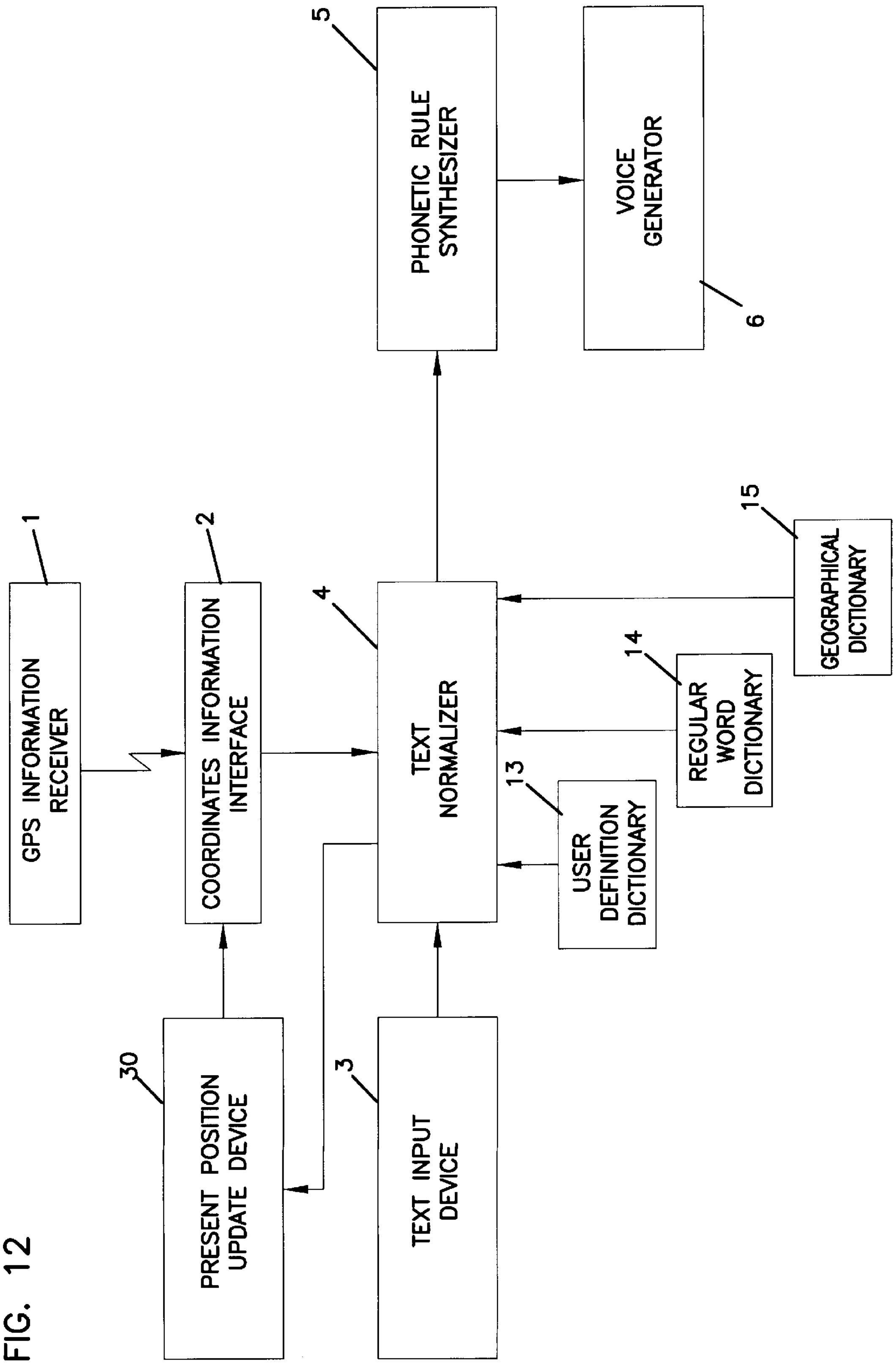
FIG. 12 is a block diagram of a third preferred embodiment in the text to speech conversion system according to the present invention.

FIG. 12 shows a block diagram of the text to speech conversion system of a third embodiment according to the present invention. In the third embodiment, the text to speech conversion system additionally has a present position update device 30 which is connected with a text normalizer 4 and a coordinate information interface 2. Still referring to FIG. 12, substantially same elements in the first embodiment and the second embodiment are not described.

In both of the above embodiments, when the text to speech conversion system receives information on an area from a Frequency Modulation Teletext Broadcast, since the Frequency Modulation Teletext Broadcast, since the Frequency Modulation Teletext Broadcast handles the information concerning a broad area, it is conceivable that the system makes a mispronunciation of the geographical name that has plural pronunciations with the same notation. For example, when a mobile unit equipped with the text to speech conversion system is moving near "mita" in Kanto region far from "sanda," and if the text to speech conversion system receives a message of 兵庫県 三田 市で. . . (the pronunciation is "Hyogo-ken sanda-shi de . . . "), the text to speech conversion system makes an error in pronunciation of "Mita-shi" even though the text to speech conversion system should pronounce "sanda-shi." For this reason, the system additionally has a present position update device 30. The present position update device 30 renews coordinate data of the present position inputted from a GPS information receiver 1 on the basis of the coordinate information which corresponds to the geographical name that is extracted from the text input device 3, as shown in FIG. 12. After consulting to the geographical name dictionary 15 if the text normalizer 4 and the morpheme analyzer 11 determine that a geographical name exists in the inputted text data, the present position update device 30 renews coordinates information corresponding to the geographical name to a set of proper coordinates.

Figure 13:
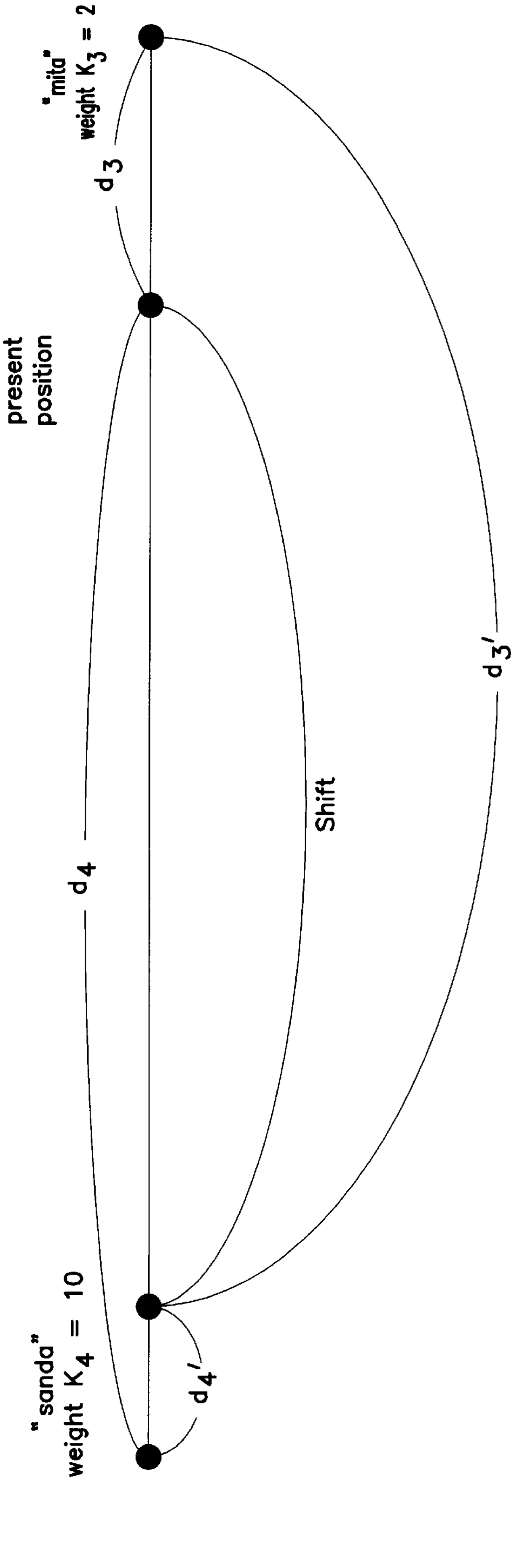
FIG. 13 is a conceptional position relation of the third preferred embodiment in the text to speech conversion system according to the present invention.

Referring to FIG. 13, the pronunciation of "sanda" is assigned weight K4 (for example K4=10). Furthermore, the pronunciation of "mita" is assigned weight K3 (for example K3=2). The text to speech conversion system is assumed to be located near "mita" compared with "sanda." To be more specific, the actual distance (d3) between the present position of the text to speech conversion system and coordinates corresponding to the "mita" is "2." The actual distance (d4) between the present position of the text to speech conversion system and coordinates corresponding to the "sanda" is "8." The calculated virtual distance (D3) between the present position of the text to speech conversion system and coordinates corresponding to the "mita" becomes 4 (2*2). The calculated virtual distance (D4) between the present position of the text to speech conversion system and coordinates corresponding to the "sanda" also becomes 80 (8*10). Therefore, the text to speech conversion system selects the pronunciation corresponding to "mita" even though the text to speech conversion system should select the pronunciation of "sanda" in the third embodiment.

Thereupon, the present position of the text to speech conversion system is shifted to the position near "sanda" from the position near "mita." To be more specific, the present position of the text to speech conversion system is shifted a distance of "7" from the position near "mita" to the position near "sanda." The shifted distance (d3') between the present position of the text to speech conversion system and coordinates corresponding to the "mita" is "9." The shifted distance (d4') between the present position of the text to speech conversion system and coordinates corresponding to the "sanda" is "1." The shifted virtual distance (D3') between the present position of the text to speech conversion system and coordinates corresponding to the "mita" becomes 18 (9*2). The shifted virtual distance (D4') between the present position of the text to speech conversion system and coordinates corresponding to the "sanda" also becomes 10 (1*10). In this case, the shifted virtual distance (D4') corresponding to the pronunciation of "sanda" become shorter than the shifted virtual distance (D3') corresponding to the pronunciation of "mita." Therefore, the text to speech conversion system is capable of selecting the correct pronunciation of "sanda."

For example, when the text to speech conversion system receives a message of 兵庫県 三山 市で. . . and the 兵庫県 exists in the geographical name dictionary 15, the system properly selects the pronunciation, "Sanda" in order to change the present position into "Hyogo Prefecture" with the present position update device 30 about the above message even though the mobile unit is moving near "mita" in Tokyo.

In the third embodiment, the text to speech conversion system changes its present position according to the received text. The geographical dictionary 15 is capable of replacing according to position information of the received text. If a mobile unit is equipped with the text to speech conversion system which has a Tokyo version of the geographical dictionary, and if the mobile unit is moving near "mita," the text to speech conversion system receives the text information concerning "sanda" from Hyogo Prefecture. The text to speech conversion system changes the Tokyo version of the geographical dictionary to Hyogo version according to the position information of the received text. Subsequently, the text to speech conversion system is capable of precisely distinguishing "Sanda" on the basis of the changed geographical dictionary.

The above embodiments are explained using the Japanese language as an example. However, the embodiments are not limited to Japanese and are capable of solving the similar problem in the English language.

Figure 14:
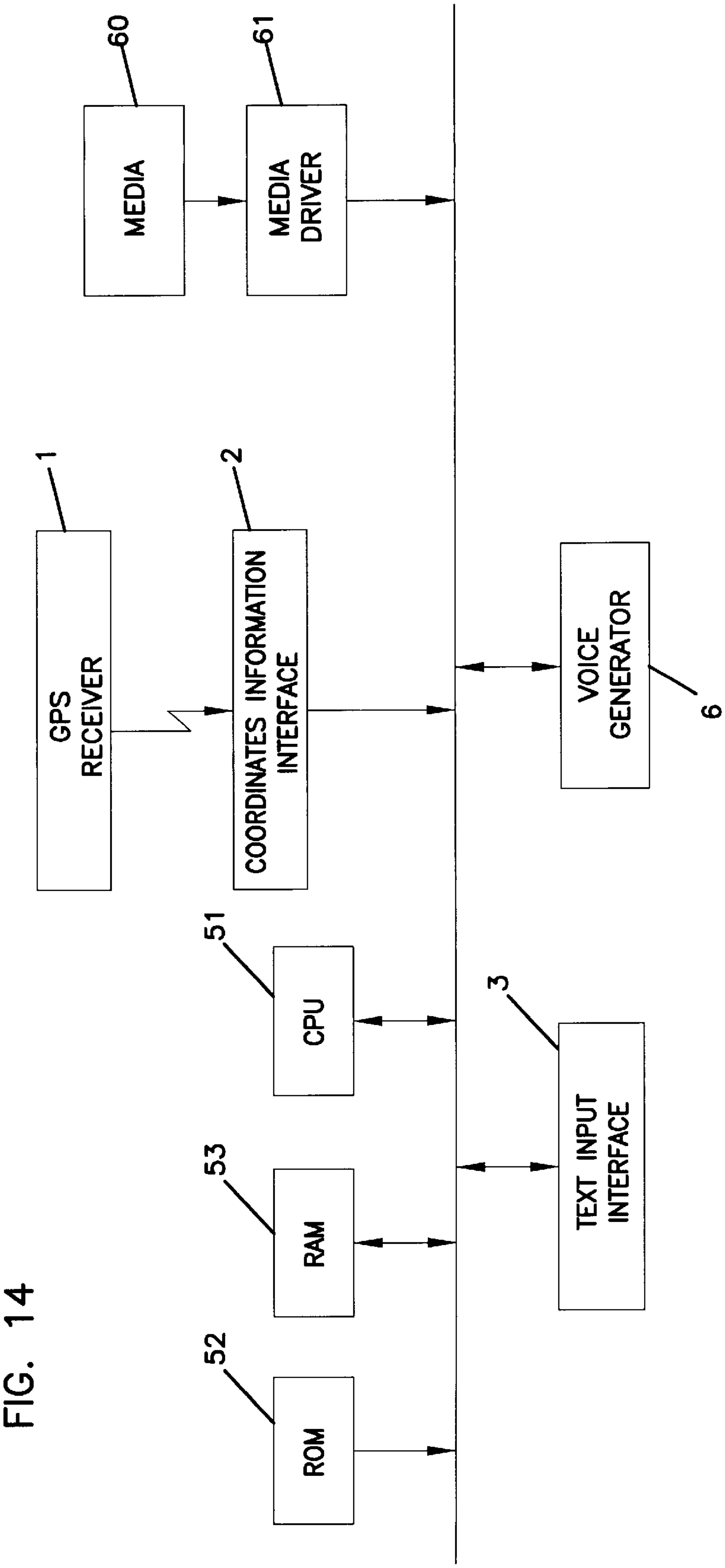
FIG. 14 is a block diagram of the text to speech conversion system according to the present invention.

FIG. 14 shows the hardware constitution of the text to speech conversion system according to the present invention. The text to speech conversion system is materialized with a computer. The system includes a CPU 51, a ROM 52, a RAM 53, the coordinate information interface 2, the GPS receiver 1, a media 60, a media driver 61, the text input interface 3 and the voice generator 6. The CPU 51 controls an entire system. The ROM 52 stores a control program for the CPU 51. The RAM 53 is used as a work area for the CPU 51. A separate RAM also sets up for each dictionary such as an user dictionary 13, a regular words dictionary 14 and a geographical name dictionary 15.

Furthermore, the CPU 51 performs the functions of a text normalizer 4, a phonetic rules synthesizer 5 and a present position update device 30. The software for the text normalizer 4 and the phonetic rules synthesizer 5 etc in the CPU 51 is stored in recording media such as a CD-ROM. In the above case, a record media driver is separately set up.

Namely, the text to speech conversion system of the present invention is materialized by reading the program that is stored in the recording media such as a CD-ROM, ROM, RAM, flexible disk, a memory card in a conventional computer system. In this case, this software is offered in condition that is stored to a record medium. The program stored in the recording medium is installed to the memory storage, for example, a hard disk device that is incorporated to a hardware system. Also, the software is incorporated to the above hardware system from a server, besides storing the program in the record medium.

Obviously, numerous modifications and variations of the present invention are possible in light of the above teachings. It is therefore to be understood that within the scope of the appended claims, the invention may be practiced otherwise than as specifically described herein.

What is claimed is:

1. A text to speech conversion system that distinguishes geographical names based upon a present position, comprising:

a text input unit for inputting text data;

a position coordinator input unit for inputting present location information of the text to speech conversion system; and a text normalizer connected to said text input unit and said position coordinator input unit capable of generating a plurality of pronunciation signals indicative of a plurality, of pronunciations for a common portion of the text data, said text normalizer selecting one of the pronunciation signals based upon the present location information.

2. A text to speech conversion system that distinguishes geographical names based upon the present position according to claim 1, wherein said text normalizer generates phonetic symbols indicative of a plurality of pronunciations for a common portion of the text data.

3. A text to speech conversion system that distinguishes geographical names based upon the present position according to claim 2, further comprising:

a phonetic rules synthesizer connected to said text normalizer for converting the phonetic symbols to phonetic signals.

4. A text to speech conversion system that distinguishes geographical names based upon the present position according to claim 1, further comprising:

a geographical dictionary operationally connected to said text normalizer for storing text data having plural pronunciations with the same notation and geographical data corresponding to the text data.

5. A text to speech conversion system that distinguishes geographical names based upon the present position according to claim 3, further comprising:

a voice generator connected to said text normalizer via said phonetic rules synthesizer for generating a voice output on the basis of said phonetic signals.

6. A text to speech conversion system that distinguishes geographical names based upon the present position according to claim 4, further comprising:

a distance calculator connected in said text normalizer for calculating distances between the present location of the text to speech conversion system and positions corresponding to each plural pronunciations with the same notation.

7. A text to speech conversion system that distinguishes geographical names based upon the present position according to claim 6, further comprising:

a distance comparator connected to said geographical dictionary via said distance calculator in said text normalizer for comparing said distances between the present coordinates of the text to speech conversion system and positions corresponding to each plural pronunciations with the same notation; wherein said text normalizer selecting an appropriate pronunciation based upon the comparison of said distance comparator.

8. A text to speech conversion system that distinguishes geographical names based upon the present position according to claim 6, further comprising:

a weight assignment processor connected to said geographical dictionary via said distance calculator for assigning each of the distances one of weight parameters stored in said geographical dictionary, when the text which have plural pronunciations with the same notation is detected.

9. A text to speech conversion system that distinguishes geographical names based upon the present position according to claim 8, wherein said distance comparator connected to said weight assignment processor for comparing the assigned distances between the present coordinates of the text to speech conversion system and positions corresponding to each plural pronunciations with the same notation wherein said text normalizer selecting an appropriate pronunciation based upon the comparison of said distance comparator.

10. A text to speech conversion system that distinguishes geographical names based upon the present position comprising according to claim 1, further comprising:

a present position update device connected to said text normalizer and said position coordinator input unit for renewing the present location information corresponding to the text data which is outputted from the text input unit when the text input unit inputs the text data including geographical names.

11. A text to speech conversion system that distinguishes geographical names based upon the present position comprising:

a text input unit for inputting text data;

a phonetic rules synthesizer connected to said text input unit for converting phonetic symbols to phonetic signals;

a voice generator connected to said phonetic rules synthesizer generating a voice output on the basis of the phonetic signals;

a position coordinator input unit for inputting present location information of the text to speech conversion system and operationally connected to a geographical dictionary storing text having plural pronunciations with the same notation and coordinate data corresponding to the text data;

a text normalizer connected to said text input unit and said phonetic rules synthesizer for converting the text data to the phonetic symbols based upon a morpheme analysis as well as a phoneme and prosody rules operation, said text normalizer selecting a pronunciation according to the present location information; and a present position update device connected to said text normalizer and said position coordinator input unit for renewing the location information corresponding to the text data which is outputted from the text input unit when the text input unit inputs the text data including geographical names.

12. A text to speech conversion apparatus that distinguishes geographical names based upon the present position, comprising:

text input means for inputting text data;

position coordinator input means for inputting present location information of the text to speech conversion system; and text normalizing means for capable of generating a plurality of pronunciation signals indicative of a plurality of pronunciations for a common portion of the text data, said text normalizing means selecting one of the pronunciation signals based upon the present location information.

13. A text to speech conversion apparatus that distinguishes geographical names based upon the present position according to claim 12, wherein said text normalizing means generates phonetic symbols indicative of a plurality of pronunciations for a common portion of the text data.

14. A text to speech conversion apparatus that distinguishes geographical names based upon the present position according to claim 13, further comprising:

phonetic rules synthesizing means for converting the phonetic symbols to phonetic signals.

15. A text to speech conversion apparatus that distinguishes geographical names based upon the present position according to claim 14, further comprising:

voice generating means for generating a voice output on the basis of said phonetic signals which said phonetic symbols are converted by said phonetic rules synthesizing means.

16. A text to speech conversion apparatus that distinguishes geographical names based upon the present position according to claim 12, further comprising:

geographical dictionary means for storing text data having plural pronunciations with the same notation and geographical data corresponding to the text data.

17. A text to speech conversion apparatus that distinguishes geographical names based upon the present position according to claim 16, further comprising:

distance calculating means for calculating distances between the present coordinates of the text to speech conversion system and positions corresponding to each plural pronunciations with the same notation.

18. A text to speech conversion apparatus that distinguishes geographical names based upon the present position according to claim 17, further comprising:

distance comparing means for comparing said distances between the present coordinates of the text to speech conversion system and positions corresponding to each plural pronunciations with the same notation wherein said text normalizing means selecting an appropriate pronunciation based upon the comparison of said distance comparing means.

19. A text to speech conversion apparatus that distinguishes geographical names based upon the present position according to claim 16, further comprising:

weight assigning means for assigning each of the distances weight parameters stored in said geographical dictionary means, when the text which have plural pronunciations with the same notation is detected.

20. A text to speech conversion apparatus that distinguishes geographical names based upon the present position according to claim 19 wherein said distance comparing means for comparing the weight assigned distances between the present coordinates of the text to speech conversion system and positions corresponding to each plural pronunciations with the same notation wherein said text normalizing means selecting an appropriate pronunciation based upon the comparison of said distance comparing means.

21. A text to speech conversion apparatus that distinguishes geographical names based upon the present position comprising according to claim 12 further comprising:

present position update means for renewing the present location information corresponding to the text data which is outputted from the text input unit when the text input unit inputs the text data including geographical names.

22. A text to speech conversion apparatus that distinguishes geographical names based upon the present position comprising:

text input means for inputting text data;

phonetic rules synthesizing means for converting phonetic symbols to phonetic signals;

voice generating means for generating a voice output on the basis of the phonetic signals;

position coordinator input means for inputting present location information of the text to speech conversion system;

text normalizing means for converting the text data to phonetic symbols based upon a morpheme analysis as well as a phoneme and prosody rules operation, said text normalizing means selecting a pronunciation according to the present situation; and present position update means for renewing the coordinates data corresponding to the text data which is outputted from the text input means when the text input means inputs the text data including georaphical names.

23. A method of converting text to speech, comprising the steps of:

inputting text data;

inputting a present location information;

converting a common portion of the text data to multiple pronunciations;

selecting one of the multiple pronunciations based upon the present location information;

converting the text data to phonetic symbols on the basis of a morpheme analysis operation and a phoneme and prosody rules operation;

inputting a present coordinates of the text to speech conversion system; and outputting a phonetic symbol that matches the inputted present coordinates of the text to speech conversion system and one of the coordinates data of plural pronunciations with the same notation, in the case that plural pronunciations are extracted with the same notation in a geographical dictionary, when the inputted text data have plural pronunciations as the consulting result of the geographical dictionary during morpheme analysis.

24. A method of converting text to speech, according to claim 23 further comprising the steps of:

converting the phonetic symbols to phonetic signals; and generating voices on the basis of the phonetic signals.

25. A method of converting text to speech, according to claim 23 further comprising the steps of:

calculating distances between the present coordinates of the text to speech conversion system and positions corresponding to each plural pronunciations with the same notation of the text data;

comparing the calculated distances; and selecting a proper pronunciation based upon the comparison result.

26. A method of converting text to speech, according to claim 25 further comprising the steps of:

preserving parameters to which are assigned weight corresponding to each of plural pronunciations with the same notation.

27. A method of converting text to speech, according to claim 26 further comprising the steps of:

assigning the distances on the basis of the preserved parameters, when the text data have plural pronunciations with the same notation.

28. A method of converting text to speech, according to claim 23 further comprising the steps of:

renewing the coordinates data corresponding to the text to speech conversion system when the inputted text data contains geographical names.

* * * * *